US012803234B2

(12) United States Patent
Roh et al.

(10) Patent No.: US 12,803,234 B2
(45) Date of Patent: Nov. 17, 2026

(54) USB ADAPTER FOR VEHICLE

(71) Applicant: UNICK CORPORATION, Gimhae-si (KR)

(72) Inventors: Eui-Dong Roh, Gimhae-si (KR); Wook-Hyun Choi, Gimhae-si (KR); Tae-Yong Kim, Gimhae-si (KR); Seung-Min Han, Gimhae-si (KR); Chan-Gu Yun, Gimhae-si (KR)

( * ) Notice: Subject to any disclaimer, the term of this patent is extended or adjusted under 35 U.S.C. 154(b) by 334 days.

(21) Appl. No.: 18/521,923

(22) Filed: Nov. 28, 2023

(65) Prior Publication Data

US 2024/0178626 A1 May 30, 2024

(30) Foreign Application Priority Data

Nov. 29, 2022 (KR) ........................ 10-2022-0163283
Nov. 29, 2022 (KR) ........................ 10-2022-0163284

(51) Int. Cl.
*H01R 31/06* (2006.01)

(52) U.S. Cl.
CPC ....... *H01R 31/065* (2013.01); *H01R 2201/26* (2013.01)

(58) Field of Classification Search
CPC ............................ H01R 31/65; H01R 2201/26
USPC ............................................................ 439/34
See application file for complete search history.

(56) References Cited

U.S. PATENT DOCUMENTS 7,507,119 B2 * 3/2009 Ni ...................... H01R 13/7175 439/607.31
7,903,408 B1 * 3/2011 Yu ...................... H05K 7/20136 257/721
9,716,350 B2 7/2017 Taniguchi et al.
2017/0171995 A1 * 6/2017 Lee ...................... H05K 5/0215

FOREIGN PATENT DOCUMENTS

CN 209626597 U * 11/2019
CN 209636597 U 11/2019
CN 209692625 U * 11/2019
CN 210201542 U * 3/2020
CN 212323136 U * 1/2021
CN 113382582 A * 9/2021 ............ F16F 15/085
JP 2017126612 A 7/2017
KR 20060117250 A * 11/2006 ............... H05K 7/20
KR 20150115632 A 10/2015
KR 101757204 B1 7/2017
KR 20220008178 A * 1/2022 .............. F28F 3/025
WO WO-2022021736 A1 * 2/2022 ............... H05K 7/20

OTHER PUBLICATIONS

Extended European Search Report for corresponding European Application No. 23211712.7, dated May 2, 2024, 9 pgs.

* cited by examiner

*Primary Examiner* — Abdullah A Riyami

(57) ABSTRACT

Disclosed is a USB adapter for a vehicle that can effectively dissipate heat generated during power supply and data transmission. The USB adapter includes a casing installed at a center fascia or a console box of the vehicle, wherein one surface of the casing is open; a printed circuit board received inside the casing, wherein a USB port is mounted at one end (Continued)

of the printed circuit board and a receptacle is mounted at the other end of the printed circuit board; and a heat dissipation member configured to transfer heat generated during power supply and data transmission to the casing, such that the casing dissipates the heat out of the USB adapter.

8 Claims, 6 Drawing Sheets

USB ADAPTER FOR VEHICLE

CROSS-REFERENCE TO RELATED APPLICATION(S)

This application claims priority from Korean Patent Application Nos. 10-2022-0163283 and 10-2022-0163284 both filed on Nov. 29, 2022 in the Korean Intellectual Property Office, and all the benefits accruing therefrom under 35 U.S.C. 119, the contents of which in their entireties are herein incorporated by reference.

BACKGROUND

Technical Field

The present disclosure relates to a USB adapter for a vehicle, and more specifically, to a USB adapter for a vehicle that may effectively dissipate heat generated in power supply and data transmission.

Description of Related Art

As the use of information and communication devices for vehicles, including navigation devices, black boxes, and high-pass terminals increases, recently produced vehicles are equipped with power outlets to ensure stable supply of power to the information and communication devices.

For example, in small vehicles, the power outlet is installed in a form of a cigarette lighter with a power outlet function to increase installation space efficiency thereof and reduce a cost. In mid-size vehicles, the power outlet is installed in the center fascia, the console box, the trunk, etc. in a form of a power outlet separate from the cigarette lighter.

A recently produced vehicle includes a USB (Universal Serial Bus) adapter for the vehicle via which an external device such as a portable electronic device or a portable storage device is connected to the vehicle to supply power or transmit data.

In particular, the USB adapter is installed for the vehicle, which has separate charging and data transmission/reception paths so that the external device can be charged at a high speed and large data can be transmitted quickly.

However, in the USB adapter for the vehicle capable of high-speed charging and large-capacity data transmission, a larger amount of heat is generated during the charging and/or data transmission process, thereby affecting the performance and lifespan of the device.

For example, when a printed circuit board on which components such as integrated circuits, condensers, inductors, and resistors are mounted overheats, charging efficiency may decrease or malfunction may occur, and in severe cases, the components may be damaged.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is intended to solve the problems of the prior art as described above. A purpose of the present disclosure is to provide a USB adapter for a vehicle that can effectively dissipate the heat generated in power supply and data transmission.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

One aspect of the present disclosure provides a USB (Universal Serial Bus) adapter for a vehicle, the USB adapter comprising: a casing installed at a center fascia or a console box of the vehicle, wherein one surface thereof is open; a printed circuit board received inside the casing, wherein a USB port is mounted at one end of the printed circuit board and a receptacle is mounted at the other end thereof; and a heat dissipation member configured to transfer heat generated during power supply and data transmission to the casing, such that the casing dissipates the heat out of the USB adapter.

In one implementation, the heat dissipation member includes a heat dissipation pad attached to an end of a component mounted on the printed circuit board, wherein the USB adapter further comprises at least one heat dissipation pin extending from the casing toward the heat dissipation pad and contacting the heat dissipation pad.

In one implementation, the heat dissipation member is made of an elastic material to improve a contact area between the heat dissipation member and the component mounted on the printed circuit board and a contact area between the heat dissipation member and the heat dissipation pin.

In one implementation, the heat dissipation member is made of a thermally conductive silicone resin composition containing a thermally conductive filling material.

In one implementation, the thermally conductive silicone resin composition has a thermal conductivity in a range of 1 to 10 W/mk (Watts per meter-Kelvin).

In one implementation, the heat dissipation member fills an inside of the casing so as to surround at least a portion of the printed circuit board. In one implementation, the heat dissipation member is made of a thermally conductive silicone resin composition containing a thermally conductive filling material. In one implementation, the thermally conductive silicone resin composition has a thermal conductivity in a range of 1 to 10 W/mk.

In one implementation, the casing is made of a thermally conductive material capable of dissipating the heat transferred through the heat dissipation pad out of the adapter.

In one implementation, the thermally conductive material includes a thermally conductive plastic material.

In one implementation, the thermally conductive material includes an aluminum material.

The USB adapter for the vehicle according to the present disclosure as configured as described above has the heat dissipation member inside the casing to effectively dissipate the heat generated from the printed circuit board, thereby prevent a decrease in charging efficiency and device malfunction due to the heat during the power supply and data transmission, and preventing the components mounted on the printed circuit board from being damaged by the heat, thereby improving durability thereof.

In addition to the effects as described above, specific effects in accordance with the present disclosure will be described together with the following detailed description for carrying out the disclosure.

DETAILED DESCRIPTION

Figure 1:
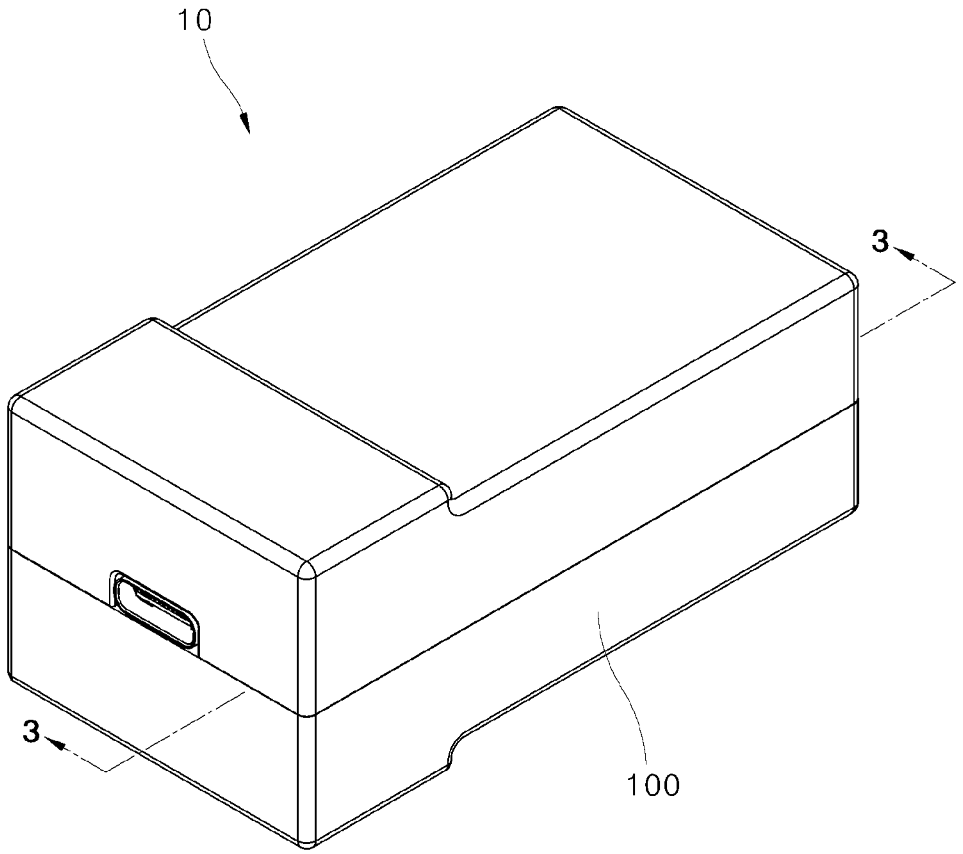
FIG. 1 is a perspective view of a USB adapter for a vehicle according to an embodiment of the present disclosure.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may include within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between and connected to the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like may be disposed "on" or "on a top" of another layer, film, region, plate, or the like, the former may directly contact the latter or still another layer, film, region, plate, or the like may be disposed between and connected to the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between and connected to the former and the latter. Further, as used herein, when a layer, film, region, plate, or the like may be disposed "below" or "under" another layer, film, region, plate, or the like, the former may directly contact the latter or still another layer, film, region, plate, or the like may be disposed between and connected to the former and the latter. As used herein, when a layer, film, region, plate, or the like is directly disposed "below" or "under" another layer, film, region, plate, or the like, the former directly contacts the latter and still another layer, film, region, plate, or the like is not disposed between and connected to the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may be actually executed at the same time. Depending on a related function or operation, the blocks may be executed in a reverse sequence.

The features of the various embodiments of the present disclosure may be partially or entirely combined with each other, and may be technically associated with each other or operate with each other. The embodiments may be implemented independently of each other and may be implemented together in an association relationship.

Spatially relative terms, such as "beneath," "below," "lower," "under," "above," "upper," and the like, may be used herein for ease of explanation for illustrating one element or feature's relationship to another element or feature as illustrated in the figures. It will be understood that the spatially relative terms are intended to encompass different orientations of the device in use or in operation, in addition to the orientation depicted in the figures. For example, when the device in the drawings may be turned over, elements described as "below" or "beneath" or "under" other elements or features would then be oriented "above" the other elements or features. Thus, the example terms "below" and "under" may encompass both an orientation of above and below. The device may be otherwise oriented, for example, rotated 90 degrees or at other orientations, and the spatially relative descriptors used herein should be interpreted accordingly.

Hereinafter, preferred embodiments of the present disclosure will be described with reference to the attached drawings.

The present disclosure provides a USB adapter for a vehicle that connects an external device such as a portable electronic device or a portable storage device to the vehicle to supply power or transmit data thereto. In particular, the present disclosure provides a USB adapter for a vehicle that can effectively dissipate heat generated during power supply and data transmission.

Figure 2:
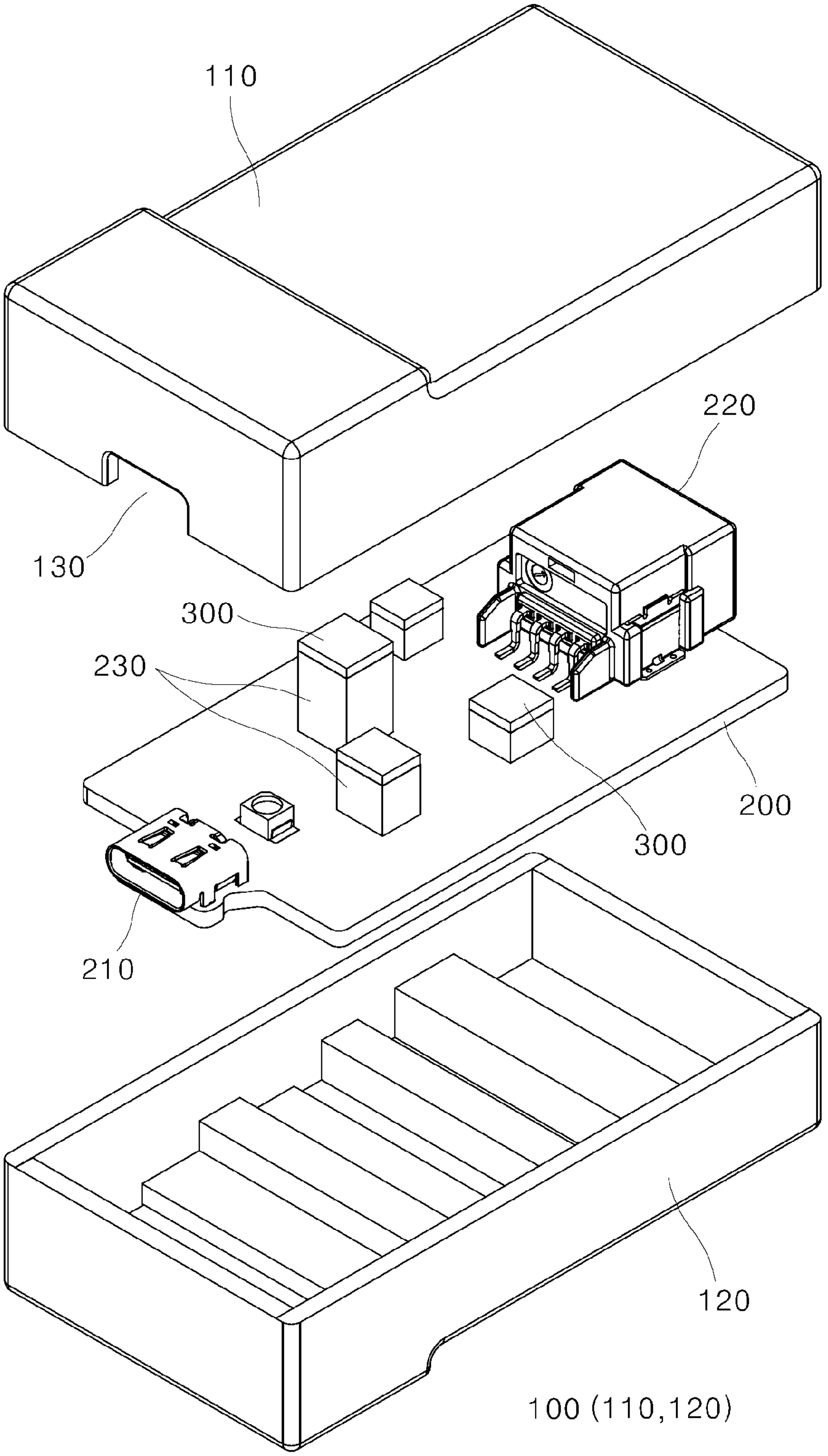
FIG. 2 is an exploded perspective view of a USB adapter for a vehicle according to an embodiment of the present disclosure.

The USB adapter for the vehicle according to one embodiment of the present disclosure will be described referring to FIG. 1 to FIG. 3.

A USB adapter 10 for a vehicle according to the present embodiment includes a casing 100, a printed circuit board 200 provided inside the casing 100, and a heat dissipation member 300 for dissipating heat generated during power supply and data transmission.

The casing 100 is a portion that constitutes an exterior appearance of the USB adapter 10 for a vehicle, and is a kind of a housing that surrounds and protects the printed circuit board 200 on which a USB port 210, a receptacle 220, and various components 230 are mounted.

The casing 100 of the present embodiment has a multi-stage rectangular parallelepiped shape extending in one direction, and is composed of an upper casing 110 and a lower casing 120 that may be assembled with each other in a separable manner from each other as needed.

The inside of the casing 100 is hollow to allow the printed circuit board 200 to be received therein. Through-holes 130 and 140 are formed in front and rear surfaces of the casing 100, respectively. In this regard, the USB port 210 for connection to an external device (not shown) is located in the through-hole 130 formed in the front surface of casing 100. The receptacle 220 for connection to the vehicle (not shown) is located in the through-hole 140 formed in the rear surface of the casing 100.

Multiple heat dissipation pins 150 are disposed inside the casing 100. The heat dissipation pins 150 are used to dissipate, to the outside, the heat generated from the various components 230 mounted on the printed circuit board 200 during power supply and data transmission. The heat dissipation pins 150 protrude from an inner wall of the casing 100 toward the printed circuit board 200 and come into contact with a heat dissipation member 300, which will be described later.

In one example, the casing 100 of the present embodiment is made of a thermally conductive material to effectively dissipate the heat transferred through the plurality of heat dissipation pins 150. That is, during the power supply and data transmission, the heat generated from the various components 230 mounted on the printed circuit board 200 is transferred to the casing 100 through the heat dissipation member 300 and the heat dissipation pins 150 and is then emitted to the outside. Thus, when the casing 100 is made of the thermally conductive material, the heat may be dissipated effectively.

For this purpose, the casing 100 may be made of a thermally conductive plastic material or an aluminum material.

The thermally conductive plastic material may be produced by adding a thermally conductive compound to an engineering plastic, and may have a thermal conductive ability equal to that of a metal. In this regard, adjusting an additive added thereto may allow thermally conductive plastics of different thermal conductivities to be produced depending on need.

Furthermore, the aluminum material is not only thermally conductive, but is also lightweight, and may be formed using a die casting method, resulting in high productivity. In particular, a surface protection effect thereof may be improved when the aluminum material is surface-treated by applying an anodizing process using surface oxidation characteristics thereto.

In another example, in the present embodiment, the casing 100 is illustrated as having the structure in which the upper and lower casings are assembled with each other in the separable manner. However, the present disclosure is not necessarily limited thereto. The casing may have a shape of a hollow pipe that may accommodate the printed circuit board 200 therein.

The printed circuit board 200 refers to a board on which circuits for power supply and data transmission are printed.

The USB port 210 is mounted at one end of the printed circuit board 200 and connects to an external device (not shown). The receptacle 220 is mounted at the other end thereof and connects to the vehicle (not shown).

Furthermore, the components 230 such as integrated circuits, condensers, inductors, and resistors that constitute the circuits for power supply and data transmission may be mounted on an upper surface and a lower surface of the printed circuit board 200.

The heat dissipation member 300 is used to transfer the heat generated during power supply and data transmission to the casing 100 which in turn dissipates the same to the outside.

Figure 3:
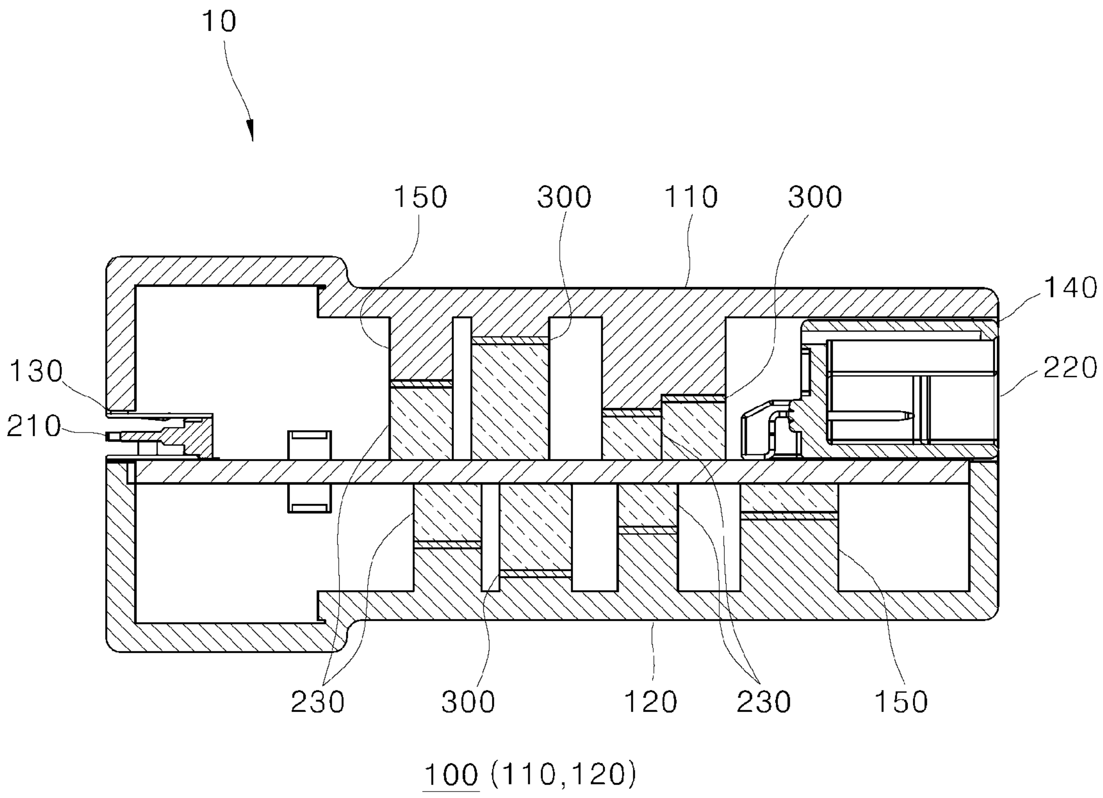
FIG. 3 is a cross-sectional view of a USB adapter for a vehicle according to an embodiment of the present disclosure.

As shown in FIG. 3, the heat dissipation member 300 may be embodied as a heat dissipation pad with a predetermined thickness. The heat dissipation member 300 is attached to vertical ends of the components 230 such as the integrated circuits, the condensers, the inductors, and the resistors mounted on the printed circuit board 200, and comes into contact with the heat dissipation pins 150 when assembling the casing 100.

The heat dissipation member 300 may be made of a thermally conductive silicone resin composition containing a thermally conductive filling material to effectively dissipate the heat generated during power supply and data transmission. In this regard, the thermally conductive silicone resin composition has a thermal conductivity of 1 to 10 W/mk.

The heat dissipation member 300 as described above directly contacts the components 230 such as the integrated circuit, the condenser, the inductor, and the resistor mounted on the printed circuit board 200 and thus transfers the heat generated from the components 230 to the casing 100.

Figure 4:
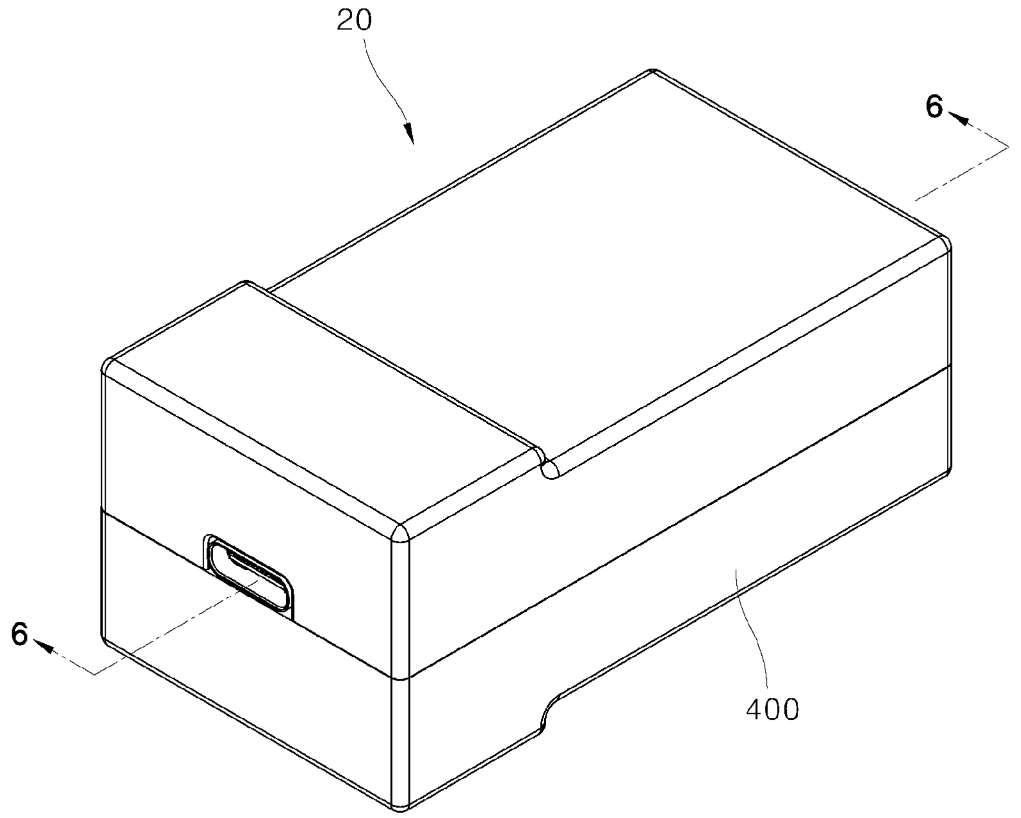
FIG. 4 is a perspective view of a USB adapter for a vehicle according to another embodiment of the present disclosure.
Figure 5:
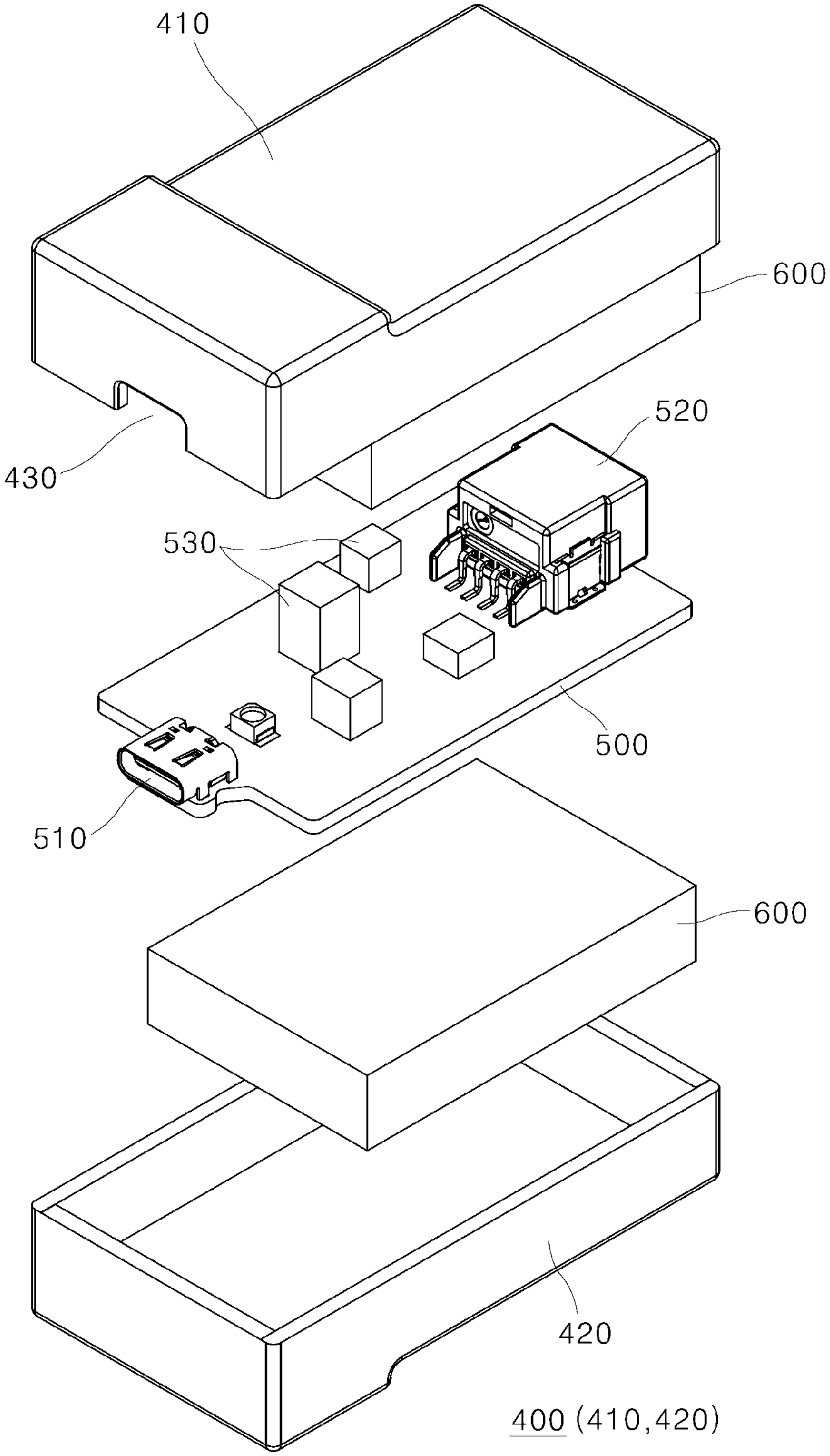
FIG. 5 is an exploded perspective view of a USB adapter for a vehicle according to another embodiment of the present disclosure.

A USB adapter for a vehicle according to another embodiment of the present disclosure will be described with referring to FIG. 4 to FIG. 6.

A USB adapter 20 for a vehicle according to the present embodiment includes a casing 400, a printed circuit board 500 provided inside the casing 400, and a heat dissipation member 600 for dissipating heat generated during power supply and data transmission.

The casing 400 is a portion that constitutes the exterior appearance of the USB adapter 20 for a vehicle, and is a kind of housing that surrounds and protects the printed circuit board 500 on which a USB port 510, a receptacle 520, and various components 530 are mounted.

The casing 400 of the present embodiment has a multi-stage rectangular parallelepiped shape extending in one direction, and is composed of an upper casing 410 and a lower casing 420 that may be assembled with each other in a separable manner from each other as needed.

An inside of the casing 400 is hollow so that the printed circuit board 500 may be installed therein. Through-holes 430 and 440 are formed in a front surface and a rear face of the casing 400, respectively.

In this regard, a USB port 510 for connection to an external device (not shown) is located in the through-hole 430 formed in the front surface of the casing 400. The receptacle 520 for connection to the vehicle (not shown) is located in the through-hole 440 formed in the rear surface of the casing 400.

In one example, the casing 400 of the present embodiment is made of a thermally conductive material to effectively dissipate the heat generated during power supply and data transmission. In other words, the heat generated from the printed circuit board 500 during power supply and data transmission is transferred to the casing 400 through the heat dissipation member 600 and then is discharged to the outside. For this reason, when the casing 400 is made of the thermally conductive material, the heat may be effectively dissipated.

For this purpose, the casing 400 may be made of a thermally conductive plastic material or an aluminum material.

The thermally conductive plastic material may be produced by adding a thermally conductive compound to an engineering plastic, and may have a thermal conductive ability equal to that of a metal. In this regard, adjusting an additive added thereto may allow thermally conductive plastics of different thermal conductivities to be produced depending on need.

Furthermore, the aluminum material is not only thermally conductive, but is also lightweight, and may be formed using a die casting method, resulting in high productivity. In particular, a surface protection effect thereof may be improved when the aluminum material is surface-treated by applying an anodizing process using surface oxidation characteristics thereto.

In another example, in the present embodiment, the casing 400 is illustrated as having the structure in which the upper and lower casings are assembled with each other in the separable manner. However, the present disclosure is not necessarily limited thereto. The casing may have a shape of a hollow pipe that may accommodate the printed circuit board 500 therein.

The printed circuit board 500 refers to a board on which circuits for power supply and data transmission are printed.

The USB port 510 is mounted at one end of the printed circuit board 500 and connects to an external device (not shown). The receptacle 520 is mounted at the other end thereof and connects to the vehicle (not shown).

Furthermore, the components 530 such as integrated circuits, condensers, inductors, and resistors that constitute the circuits for power supply and data transmission may be mounted on an upper surface and a lower surface of the printed circuit board 500.

The heat dissipation member 600 is used to transfer the heat generated during power supply and data transmission to the casing 400 which in turn dissipates the same to the outside.

Figure 6:
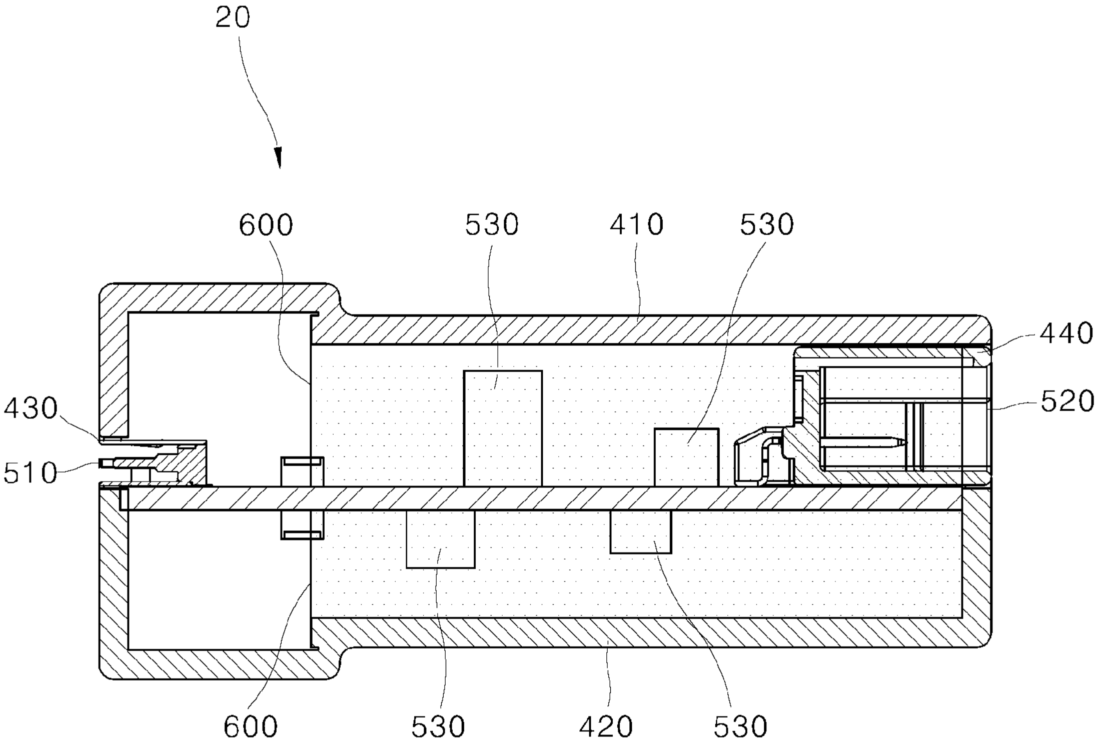
FIG. 6 is a cross-sectional view of a USB adapter for a vehicle according to another embodiment of the present disclosure.

As shown in FIG. 6, the heat dissipation member 600 is formed to surround the components 530 such as the integrated circuit, the condenser, the inductor, and the resistor mounted on the printed circuit board 500. This is because a lot of heat is generated from the components 530 during power supply and data transmission.

The heat dissipation member 600 may be made of a thermally conductive silicone resin composition containing a thermally conductive filling material to effectively dissipate the heat generated during power supply and data transmission. In this regard, the thermally conductive silicone resin composition has a thermal conductivity of 1 to 10 W/mk.

The heat dissipation member 600 as described above may fill the inside of the casing 400 in a molding form and may quickly and effectively transfer the heat generated from all of the components 530, such as the integrated circuits, the condensers, the inductors, and the resistors mounted on the printed circuit board 500 to the casing 400.

Although the embodiments of the present disclosure have been described above with reference to the accompanying drawings, the present disclosure may not be limited to the embodiments and may be implemented in various different forms. Those of ordinary skill in the technical field to which the present disclosure belongs will be able to understand that the present disclosure may be implemented in other specific forms without changing the technical idea or essential features of the present disclosure. Therefore, it should be understood that the embodiments as described above are not restrictive but illustrative in all respects.

What is claimed is:

1. A USB (Universal Serial Bus) adapter for a vehicle, the USB adapter comprising:

a casing installed at a center fascia or a console box of the vehicle, wherein one surface of the casing is open;

a printed circuit board received inside the casing, wherein a USB port is mounted at a first end of the printed circuit board and a receptacle is mounted at a second end of the printed circuit board;

a heat dissipation member configured to transfer heat generated during power supply and data transmission to the casing, such that the casing dissipates the heat out of the USB adapter, and one or more heat dissipation pins protruding from a ceiling and a bottom of the casing toward the printed circuit board, the heat dissipation pins being formed at positions corresponding to components mounted on the printed circuit board and protruding at different heights according to heights of the components, respectively, so that a gap between the heat dissipation pins and the components is consistent, wherein the heat dissipation member includes a heat dissipation pad, and the heat dissipation pad is interposed between the heat dissipation pins and the components.

2. The USB adapter of claim 1, wherein the heat dissipation pad is in contact with the components and the heat dissipation pins.

3. The USB adapter of claim 2, wherein the heat dissipation member is made of an elastic material to improve a contact area between the heat dissipation member and the components mounted on the printed circuit board and a contact area between the heat dissipation member and the heat dissipation pins.

4. The USB adapter of claim 3, wherein the heat dissipation member is made of a thermally conductive silicone resin composition containing a thermally conductive filling material.

5. The USB adapter of claim 4, wherein the thermally conductive silicone resin composition has a thermal conductivity in a range of 1 to 10 W/mk (Watts per meter-Kelvin).

6. The USB adapter of claim 1, wherein the casing is made of a thermally conductive material capable of dissipating the heat transferred through the heat dissipation pad out of the adapter.

7. The USB adapter of claim 6, wherein the thermally conductive material includes a thermally conductive plastic material.

8. The USB adapter of claim 6, wherein the thermally conductive material includes an aluminum material.

* * * * *